United States Patent Office 3,509,125
Patented Apr. 28, 1970

3,509,125
MONOAZO DYESTUFF PIGMENTS
Karl Ronco and Willy Mueller, Riehen, and Paul Mueller, Basel, Switzerland, assignors to Ciba Limited, Basel, Switzerland, a company of Switzerland
No Drawing. Filed Dec. 13, 1966, Ser. No. 601,352
Claims priority, application Switzerland, Dec. 17, 1965, 17,480/65
Int. Cl. C07c 107/08; C09b 29/20
U.S. Cl. 260—204                                 7 Claims

ABSTRACT OF THE DISCLOSURE

A monoazo dyestuff of the formula

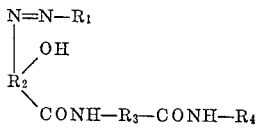

wherein $R_1$ is a benzene radical, $R_2$ is a naphthalene residue, $R_3$ is a phenylene or a diphenylene residue and $R_4$ is aryl. The compounds are valuable pigments which can be used in a finely dispersed form for coloring rayon, viscous rayon, cellulose ethers and esters as well as for the manufacture of colored lacquers.

The present invention is based on the observation that valuable monoazo dyestuff pigments of the formula (1) 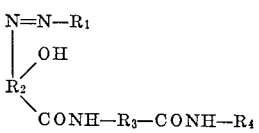

in which $R_1$ represents a benzene residue which contains no carboxylic acid amide group in the meta-position to the azo group, $R_2$ represents a naphthalene residue in which the azo, hydroxyl and carboxylic acid amide groups are in 1,2,3-position, $R_3$ represents a phenylene or diphenylene residue in which the —NH— and the —CO— groups are in para-position to each other, and $R_4$ represents a hydrogen atom or an aryl radical that is free from benzoylamino groups, can be obtained when (a) a carboxylic acid halide of the formula (2) 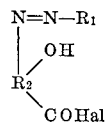

is condensed with an amine of the formula (3)            $H_2N—R_3—CONH—R_4$ or (b) a carboxylic acid halide of the formula (4) 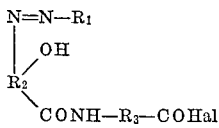

is condensed with ammonia or with an arylamine that is free from benzoylamino groups, or (c) a diazo compound of an aminobenzene that is free from a carboxylic acid amide group in the meta-position to the amino group is coupled with a naphthol of the formula (5) 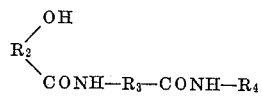

Particularly valuable dyestuffs can be obtained by condensing a carboxylic acid chloride of the formula

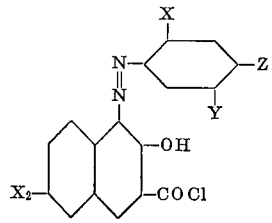

with an amine of the formula

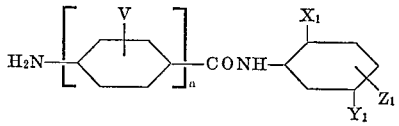

wherein V represents a hydrogen or halogen atom or an alkyl group, X and $X_1$ each represents a hydrogen or halogen atom, or an alkyl, alkoxy, phenoxy, nitro, or carbalkoxy group, Y and $Y_1$ each stands for a hydrogen or halogen atom or an alkyl, alkoxy or trifluoromethyl group, Z of hydrogen, halogen or trifluoromethyl or for a carboxylic acid anilide group, $X_2$ for a hydrogen or halogen atom or an alkoxy group, $Z_1$ for a hydrogen or halogen atom, a lower alkanoylamino or a trifluromethyl group, and $n=1$ or 2.

The carboxylic acids from which the halides of the Formula 2 are derived may be obtained when a diazo compound of an aminobenzene that contains no carboxylic acid amide group in meta-position to the amino group, especially a diazo compound of an amine of the formula

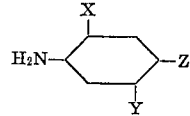

in which X, Y and Z have the above meanings, is coupled with a 2,3-hydroxynaphthoic acid, especially one of the formula

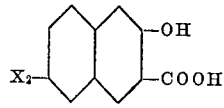

in which $X_2$ has the meaning defined above.

The following amines are suitable as diazo components:

2-chloro-4-methylaniline,
2-chloro-4-methoxyaniline,
2-chloro-4-nitroaniline,
2,4-dichloroaniline,
2,5-dichloraniline,
2,5-dibromoaniline,
2,4,5-trichloroaniline,
2-chloro-5-methylaniline,
2-chloro-5-methoxyaniline,
2-chloro-5-nitroaniline,
2,4-dimethylaniline,
2-methyl-4-chloroaniline,
2-methyl-4-methoxyaniline,
2-methyl-4-nitroaniline,
2-methyl-5-chloroaniline,
2-methyl-5-methoxyaniline,
2-methyl-5-nitroaniline,
2-methoxy-4-chloroaniline,
2-methoxy-4-methylaniline,
2-methoxy-4-nitroaniline,
2-methoxy-5-chloroaniline,
2-methoxy-5-methylaniline,
2-methoxy-5-nitroaniline,
2-nitro-4-chloroaniline,
2-nitro-4-methylaniline,
2-nitro-4-methoxyaniline,
2,4-dinitroaniline,
2-nitro-5-chloroaniline,
2-nitro-5-methylaniline,
2-nitro-5-methoxyaniline,
2-methoxy-4-chloro-5-methylaniline,
3-trifluoromethylaniline,
2-chloro-5-trifluoromethylaniline,
2,4-dichloro-5-trifluoromethylaniline,
4-chloro-2-trifluoromethylaniline,
4-nitro-2-trifluoromethylaniline,
2-nitro-4-trifluoromethylaniline,
3,5-di(trifluoromethyl)aniline,
2-methoxy-5-trifluoromethylaniline,
2-phenoxy-5-trifluoromethylaniline,
2-para-chlorophenoxy-5-trifluoromethoxyaniline,
4-amino-3-nitrobenzoic acid aniline,
4-amino3-nitrobenzoic acid-para-chloroanilide,
4-amino-3-nitrobenzoic acid-para-chloroanilide,
4-amino-3-nitrobenzoic acid-(2′,5′-dichloroanilide),
4-amino-3-nitrobenzoic acid-(2′-chloro-5′-trifluoromethyl)-anilide.

The azo dyestuff carboxylic acids obtained are treated with reagents that are capable of converting carboxylic acids into their halides, for example chlorides or bromides, especially with phosphorus halides for example phosphorus pentabromide or phosphorus trichloride or pentachloride, phosphorus oxyhalides or preferably with thionyl chloride.

The treatment with such acid-halogenating reagents is advantageously carried out in an inert organic solvent, for example dimethylformamide, chlorobenzenes, for example mono- or dichlorobenzenes, toluene, xylene or nitrobenzene, the five last-mentioned being used, if desired with addition of dimethylformamide.

In the manufacture of the carboxylic acid halides it is generally advantageous first to dry the azo compounds which have been prepared in an aqueous medium or to dehydrate them by azeotropic distillation in an organic solvent. If desired, this azeotropic drying may be carried out immediately before the treatment with the acid-halogenating agent.

The resulting azo dyestuff carboxylic acid chlorides are condensed with monoamines of the Formula 3 which can be obtained by condensing the chloride of, for example, para-nitrobenzoic acid, 3-methyl-4-nitrobenzoic acid of 4′-nitrodiphenyl-4-carboxylic acid with ammonia or an arylamine, especially one of the formula

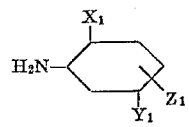

in which $X_1$, $Y_1$ and $Z_1$ have the meanings defined above, followed by reduction of the resulting nitroaryl carboxylic acid arylides to the corresponding amines.

The following arylamines may be mentioned as examples: aniline, 2-, 3- or 4-chloroaniline, 2-chloro-4-methylaniline,
2-chloro-4-methoxyaniline,
2,4-dichloraniline,
2,5-dichloroaniline,
2,5-dibromoaniline,
2,4,5-trichloroaniline,
2-chloro-5-methylaniline,
2-chloro-5-methoxyaniline,
2,4-dimethylaniline,
2-methyl-4-chloraniline,
2-methyl-4-methoxy-aniline,
2-methyl-4-nitroaniline,
2-methyl-5-chloroaniline,
2-methyl-5-methoxyaniline,
2-methoxy-4-chloraniline,
2-methoxy-4-methylaniline,
2-methoxy-5-chloraniline,
2-methoxy-5-methylaniline,
2-methoxy-4-chloro-5-methylaniline,
3-trifluoromethyl-aniline,
2-chloro-5-trifluoromethylaniline,
2,4-dichloro-5-trifluoromethylaniline,
4-chloro-2-trifluoromethylaniline,
2-methoxy-5-trifluoromethylaniline,
2-phenoxy-5-trifluoromethyl-aniline,
2,5-bis-trifluoromethylaniline, 3-aminobenzoic acid ester, 2-amino-5-chlorobenzoic acid methyl ester, 4-aminobenzoic acid methyl ester, 1- or 2-naphthylamine and 5,8-dichloro-1-aminonaphthalene.

According to modification (c) of the present invention the new dyestuff may be obtained by coupling a diazo compound of an aminobenzene that contains no carboxylic acid amide group in metaposition to the amino group, with naphthol of the Formula 5.

The coupling component of the Formula 5 may be obtained by condensing a 2,3-hydroxynaphthoic acid halide with an amine of the Formula 3.

Coupling is effected by the gradual addition of the aqueous alkaline solution of the coupling component to the acid solution of the diazonium salt. The amount of alkali metal hydroxide needed to dissolve the coupling component is advantageously selected so that it suffices to neutralize the mineral acid liberated from the diazonium salt during the coupling reaction. The coupling is advantageously carried out at a pH value from 4 to 6; the pH value is advantageously adjusted by adding a buffer. Suitable buffers are, for example, the salts, especially the alkali metal salts, of formic, phosphoric or especially of acetic acid. The alkaline solution of the coupling component advantageously contains a wetting agent, a dispersant or emulsifier, for example an aralkylsulphonate for example dodecylbenzenesulphonate or the sodium salt of 1,1′-naphthylmethanesulphonic acid, a polycondensation product of an alkylene oxide for example the reaction product of ethylene oxide and para-tertiary octylphenol; alkyl esters of sulphoricinoleates, for example n-butylsulphoricinoleates. The dispersion of the coupling component may also advantageously contain protective colloids, for example methylcellulose or a small proportion of an inert organic solvent that is sparingly soluble or insoluble in water, for example aromatic hydrochrbons, which may be halogenated or nitrated, for example benzene, toluene, xylene, chlorobenzene, a dichlorobenzene or nitrobenzene, as well as aliphatic halogenated hydrocarbons, for example carbon tetrachloride or trichlorethylene, and also water-miscible organic solvents for example acetone, methylethylketone, methanol, ethanol or isopropanol.

An alternative advantageous way of coupling consists in continuously mixing an acid solution of the diazonium salt with an alkaline solution of the coupling component in a mixing nozzle, whereby immediate coupling is achieved. It must be ensured that the diazo component and the coupling component are present in the nozzle in equimolecular proportions although a slight excess of the coupling component may prove advantageous and the simplest way of doing is to control the pH value of the liquid in the mixing nozzle. It is also necessary to provide for a thorough mixing of the two solutions in the nozzle. The dyestuff dispersion formed is continuously withdrawn from the mixing nozzle and the dyestuff is isolated by filtration.

The new dyestuffs are valuable pigments which may be applied in a wide variety of processes, for example in a finely disperse from for colouring rayon or viscose rayon, cellulose ethers and esters, polyamides, polyurethanes or polyesters in the spinning solution, as well as for the manufacture of coloured lacquers or lacquers or lake formers, solutions or products of acetylcellulose, nitrocellulose, natural or synthetic resins for example polymerization resins or condensation resins, for example aminoplasts, alkyd resins, phenoplasts, polyolefines for example polytsyrene, polyvinylchloride, polyesthylene, polypropylene, polyacrylonitrile, rubber, casein, silicone and silicone and silicone resins. They can also be advantageously used in the manufacture of coloured pencils, cosmetics or laminated sheets.

Unless otherwise indicated, parts and percentages in the following examples are by weight.

EXAMPLE 1

33.6 parts of the dyestuff obtained by diazotising 5-trifluoromethyl-2-chloro-1-aminobenzene in aqueous hydrochloric acid with sodium nitrite and coupling with 2,3-hydroxynaphthoic acid are mixed with 600 parts of benzene, 14 parts of thionyl chloride and 1 part of dimethylformamide and the batch is heated for 1 hour at 75 to 80° C. while being stirred. After cooling the reaction mixture, the uniformly crystalline monocarboxylic acid chloride of the dyestuff is filtered, washed with cold benzene and dried under vacuum at 50 to 60° C.

A mixture of 4.13 parts of the above acid chloride, 2.58 parts of 4-aminobenzoic acid-(4'-chloro)-anilide and 400 parts of ortho-dichlorobenzene is heated for 14 hours at 140 to 145° C. The crystalline, sparingly soluble pigment is then filtered while hot and washed with hot ortho-dichlorobenzene, boiling alcohol and hot water, and dried under vacuum at 70 to 80° C. The resulting dyestuff of the formula

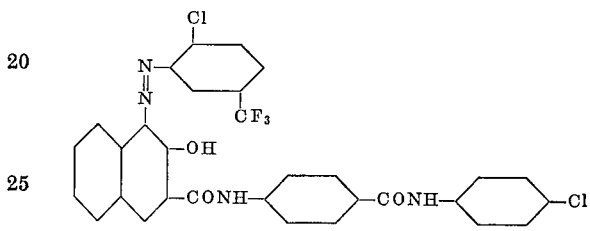

is an orange-red pigment which is sparingly soluble to insoluble in the common solvents and colours polyvinylchloride foils and lacquers orange shades which are extremely fast to light, migration and over-lacquering.

In the manner described in paragraphs 1 and 2 above the azo dyestuff monocarboxylic acids, obtained from the mononuclear diazo components of Column I and the coupling components of Column II of the following table may be reacted by way of the monoazo dyestuff carboxylic acid chlorides with 1 mol of the aromatic binuclear monamines shown in Column III. Column IV lists the shades of a polyvinylchloride foil coloured with the corresponding pigment.

| No. | I | II | III | IV |
|---|---|---|---|---|
| 1 | 2-chloro-5-trifluoro-methylaniline. | 2,3-hydroxy-naphthoic acid. | 4-aminobenzoic acid anilide. | Orange. |
| 2 | do | do | 4-aminobenzoic acid-(4'-methoxy-)anilide. | Do. |
| 3 | 2-nitro-4-trifluoro-methylaniline. | do | 4-aminobenzoic acid-(4'-chlor-)anilide. | Do. |
| 4 | 2,4,5-trichloroaniline. | do | do | Scarlet. |
| 5 | 2,5-dichloroaniline. | do | 4-aminobenzoic acid-(4'-methoxy-)anilide. | Do. |
| 6 | do | do | 4-aminodiphenyl-4'-carboxylic acid-(2'',5''-dimethyl)-anilide. | Do. |
| 7 | do | do | 4-aminodiphenyl-4'-carboxylic acid-(2''-chloro-5''-trifluoromethyl)-anilide. | Do. |
| 8 | do | do | 4-aminodiphenyl-4'-carboxylic acid anilide. | Yellowish red. |
| 9 | do | do | 4-aminodiphenyl-4'-carboxylic acid amide. | Scarlet. |
| 10 | 2-chloro-5-trifluoro-methylaniline. | do | do | Do. |
| 11 | 1-amino-2-methoxy-benzene-5-sulphonic acid diethylamide. | do | do | Red. |
| 12 | 2-nitro-4-trifluoro-methylaniline. | do | 4-aminobenzoic acid-(4'-acetyl-amino)-anilide. | Orange. |
| 13 | do | do | 4-aminobenzoic acid-(2',5'-dichloro)-anilide. | Do. |
| 14 | do | do | 4-amino-3-methyl-benzoic acid-(2'-chloro-5'-trifluoromethyl)-anilide. | Do. |
| 15 | 2-chloro-5-trifluoro-methylaniline. | do | do | Do. |
| 16 | do | 6-bromo-2,3-hydroxy-naphthoic acid. | 4-aminobenzoic acid-(4'-methoxy)-anilide. | Scarlet. |
| 17 | do | 6-methoxy-2,3-hydroxy-napthoic acid. | do | Do. |
| 18 | 2,5-dichloro-aniline. | 2,3-hydroxy-naphthoic acid. | 4-amino-3-methyl-benzoic acid-(2'-chloro-5'-trifluoromethyl)-anilide. | Orange. |
| 19 | 2,4,5-tri-chloroaniline. | do | do | Do. |
| 20 | 2-methyl-3-chloroaniline. | do | 4-aminodiphenyl-4'-carboxylic acid amide. | Scarlet. |
| 21 | do | do | 4-aminodiphenyl-4'-carboxylic acid-(2'',5''-dichlor)-anilide. | Brownish orange. |

| No. | I | II | III | IV |
|---|---|---|---|---|
| 22 | 2-aminobenzoic acid methyl ester | ----do---- | 4-aminodiphenyl-4'-carboxylic acid amide | Orange |
| 23 | ----do---- | ----do---- | 4-aminodiphenyl-4'-carboxylic acid-(4''-methoxy-)anilide | Bluish red |
| 24 | 2-aminobenzoic acid ethyl ester | ----do---- | 4-aminodiphenyl-4'-carboxylic acid amide | Do. |
| 25 | 4-aminobenzoic acid amide | ----do---- | ----do---- | Red. |
| 26 | ----do---- | ----do---- | 4-aminodiphenyl-4'-carboxylic acid-(2'',5''-dichlor)-aniline | Scarlet |
| 27 | 2-chloro-5-trifluoro-methylaniline | ----do---- | 4-aminodiphenyl-4'-carboxylic acid-(4''-acetylamino)-anilide | Orange |
| 28 | ----do---- | ----do---- | 4-aminodiphenyl-4'-carboxylic acid monomethyl-amide | Do. |
| 29 | 2,5-dichloro-aniline | ----do---- | 4-aminobenzoic acid amide | Scarlet |
| 30 | 2,4,5-tri-chloroaniline | ----do---- | ----do---- | Do. |
| 31 | 2-methoxy-4-chloroaniline | ----do---- | ----do---- | Red. |
| 32 | 2-chloro-5-trifluoro-methylanilide | ----do---- | 3-methyl-4-amino benzoic acid-(4'-acetylamino)-anilide | Scarlet |
| 33 | 2,5-dichlor-anilide | ----do---- | 4-aminodiphenyl-4'-carboxylic acid-(4''-methoxy)-anilide | Red. |
| 34 | 2-nitro-4-trifluoromethyl-aniline | ----do---- | 4-aminobenzoic acid-(2'-methyl-5'-carbomethoxy)-anilide | Orange |
| 35 | 2,5-dichlor-aniline | ----do---- | 4-aminobenzoic acid-(4'-acetyl-amino)-anilide | Scarlet |
| 36 | 2-nitro-4-tri-fluoromethyl-aniline | ----do---- | 4-aminobenzoic acid-(2'-chloro-5'-trifluoro-methyl)-anilide | Orange |

EXAMPLE 2

9.8 parts of 5-trifluoromethyl-2-chloro-1-aminobenzene are added to a mixture of 15.0 parts of ice, 25 parts of 30% hydrochloric acid 10 parts of glacial acetic acid and the whole is stirred for one hour, ice is then added to establish a temperature of −3° C., and within 5 minutes 13.4 parts of 4 N sodium nitrite solution are added so that potassium iodide-starch paper displays a distinct blue colour; then another 2.6 parts of 4 N sodium nitrite solution are added dropwise and the batch is stirred for 1 hour at 0 to 5° C. An aqueous solution of sulphamic acid is then added until the blue colour on the potassium iodide-starch paper has disappeared.

A solution of 20.7 parts of 4-(2'-hydroxy-3'-naphthoylamino)benzoic acid-(4''-methoxy)-aniline in 50 parts of ethanol, 10 parts of 30% sodium hydroxide solution, 200 parts of water and 100 parts of ethyleneglycol monoethyl ether is prepared, mixed with 1 part of the condensation product from 8 mols of ethylene oxide with 1 mol of para-tertiary octylphenol, and the naphthol is then precipitated with 70 parts of glacial acetic acid while stirring well. Coupling is effected by adding the diazo solution described in the first paragraph of this example while maintaining a pH value from 3 to 4 and a temperature from 35 to 40° C. To complete the coupling the whole is stirred for another 2 hours at the same temperature, and the resulting pigment suspension is rendered acid to Congo red with hydrochloric acid, filtered and washed with hot water until chlorine ions can no longer be detected in the filtrate. After drying at 80 to 90° C. under vacuum, a good yield of the orange-red pigment of the formula

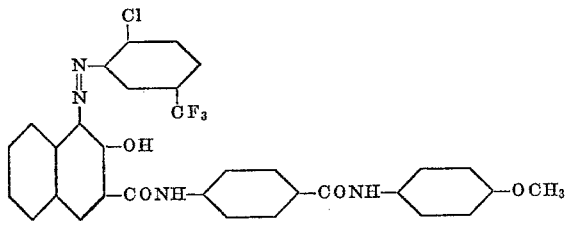

is obtained; it colours plastics, for example polyvinylchloride, and lacquers orange-red shades which have good fastness to migration, over-lacquering and light.

EXAMPLE 3

19.6 parts of 5-trifluoromethyl-2-chloro-1-aminobenzene are diazotized as described in Example 2 and filtered to clear the solution.

A solution of 43.3 parts of 4-(2'-hydroxy-3'-naphthoylamino)-benzoic acid-(4''-methoxy)-anilide in a mixture of 150 parts of ethyleneglycol monoethyl ether and 100 parts of 30% sodium hydroxide solution is prepared in the cold. The two solutions, if necessary diluted with water, are continuously supplied to a mixing nozzle in which the coupling of the components occurs immediately. The supply of the two solutions is regulated so that the pH value in the mixing nozzle is between 5 and 6. The temperature should be from 35 to 40° C. this can be controlled by adding water to the solutions of the two components. The resulting dyestuff suspension is filtered and the filter cake washed, stirred with a mixture of 20 parts of water, 110 parts of ethyleneglycol monoethyl ether and 100 parts of ortho-dichlorobenzene, and the whole is filtered. The filter residue is washed with ethyleneglycol monoethyl ether, then with methanol and dried under vacuum at 70 to 80° C. The dyestuff is obtained in a substantially quantitive yield and corresponds as to shade, purity, fine distribution and fastness properties to the products obtained according to Example No. 2 of the table in Example 1.

The pigment is obtained in a particularly good fine dispersion by adding to the solution of the diazo component or coupling component an anionic or nonionic wetting agent, for example the sodium salt of N-benzyl-$\mu$-heptadecylbenzimidazole disulphonic acid.

EXAMPLE 4

A mixture of 65 parts of stabilized polyvinyl chloride, 35 parts of dioctylphthalate and 0.2 part of the dyestuff obtained as described in Example 1, paragraph 2, is stirred and then rolled to and for on a two-roller calender for 7 minutes at 140° C. An orange coloured film having very good fastness to light and migration is obtained.

What is claimed is:

1. Monoazo dyestuff pigments of the formula

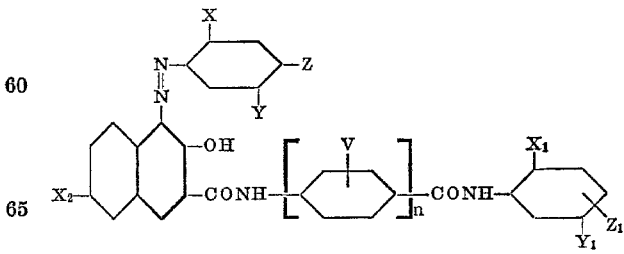

in which V represents a hydrogen or chlorine atom or methyl group, X represents a hydrogen or chlorine atom, or a methyl, lower alkoxy, phenoxy, chlorophenoxy or lower carbalkoxy group, $X_1$ represents chlorine or methyl, Y and $Y_1$ each represents a hydrogen or chlorine atom or methyl, lower alkoxy or trifluoromethyl group, Z stands for a hydrogen or chlorine atom, a trifluoromethyl, $X_2$ for a hydrogen or bromine atom or a lower alkoxy group, $Z_1$ for a hydrogen or chlorine atom or a lower alkanoylamino or a trifluoromethyl group, and $n$ is 1 or 2.

2. The dyestuff of the formula

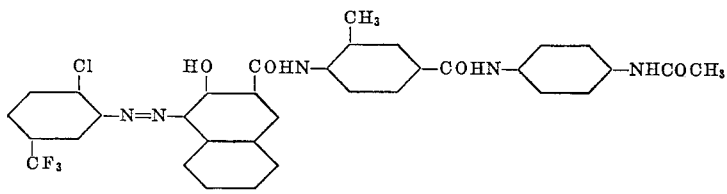

3. The dyestuff of the formula

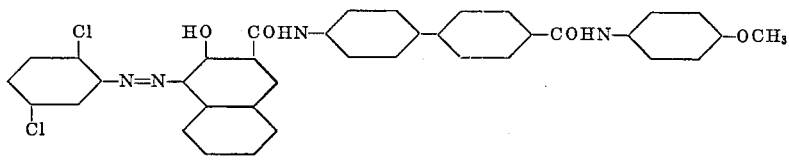

4. The dyestuff of the formula

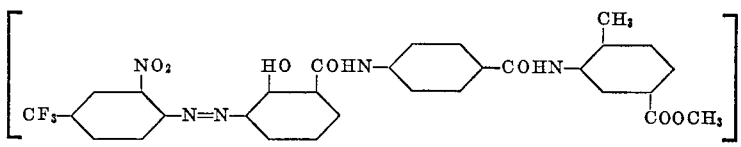

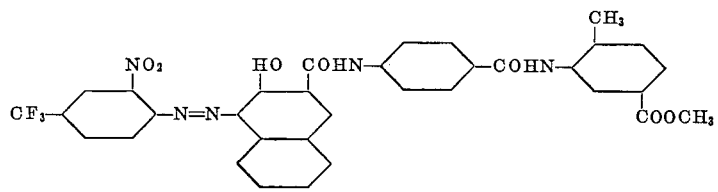

5. Monoazo dyestuff pigments of the formula

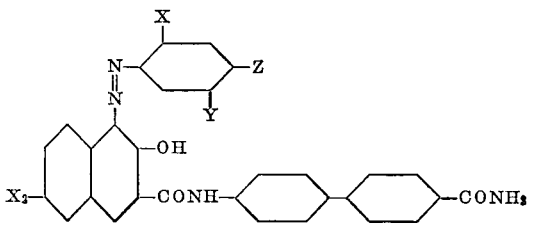

in which X represents a hydrogen or chlorine atom, or a methyl, lower alkoxy, phenoxy, chlorophenoxy or lower carbalkoxy group, $X_2$ for a hydrogen or bromine atom or a lower alkoxy group, Y represents a hydrogen or chlorine atom or methyl, lower alkoxy or a trifluoromethyl group and Z stands for a hydrogen or chlorine atom, or a trifluoromethyl.

6. The dyestuff of the formula

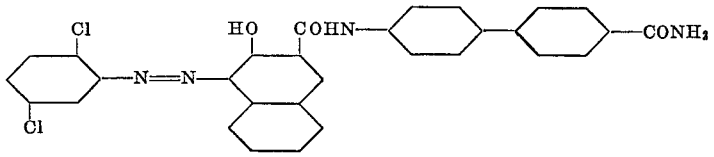

7. The dyestuff of the formula

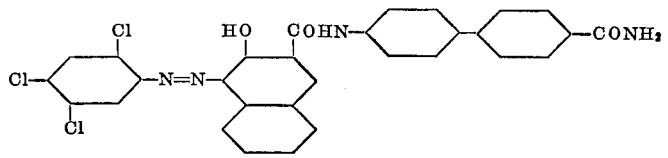

References Cited

UNITED STATES PATENTS 2,210,072  8/1940  Fischer _____ 260—204 X
3,366,623  1/1968  Ronco et al. _____ 260—204 X CHARLES B. PARKER, Primary Examiner C. F. WARREN, Assistant Examiner U.S. Cl. X.R.

8—4, 5, 41, 50; 106—23, 288, 289; 260—203, 999